United States Patent
Sanz Lopez et al.

(10) Patent No.: US 12,065,259 B2
(45) Date of Patent: Aug. 20, 2024

(54) FLUID TANK FOR INTEGRATION INTO A STRUCTURE OF AN UNMANNED AIRCRAFT

(71) Applicant: Airbus Defence and Space GmbH, Taufkirchen (DE)

(72) Inventors: Borja Sanz Lopez, Taufkirchen (DE); Clemens Brand, Taufkirchen (DE); Michael Jost, Taufkirchen (DE); Winfried Lohmiller, Taufkirchen (DE); Georg Söllinger, Aistersheim (AT); Dieter Grebner, Linz (AT); Oliver Motlik, Bad Ischl (AT)

(73) Assignee: Airbus Defence and Space GmbH, Taufkirchen (DE)

( * ) Notice: Subject to any disclaimer, the term of this patent is extended or adjusted under 35 U.S.C. 154(b) by 203 days.

(21) Appl. No.: 17/765,152

(22) PCT Filed: Sep. 30, 2020

(86) PCT No.: PCT/DE2020/200082
§ 371 (c)(1),
(2) Date: Mar. 30, 2022

(87) PCT Pub. No.: WO2021/063457
PCT Pub. Date: Apr. 8, 2021

(65) Prior Publication Data
US 2022/0388658 A1    Dec. 8, 2022

(30) Foreign Application Priority Data

Sep. 30, 2019 (DE) .......................... 102019126287.9

(51) Int. Cl.
*B64D 37/22* (2006.01)
*B64D 37/30* (2006.01)
(Continued)

(52) U.S. Cl.
CPC ............. *B64D 37/22* (2013.01); *B64D 37/30* (2013.01); *B64U 50/32* (2023.01);
(Continued)

(58) Field of Classification Search
CPC ........ B64D 37/04; B64D 37/20; B64D 37/22; B64U 50/32
See application file for complete search history.

(56) References Cited

U.S. PATENT DOCUMENTS

| 1,364,770 | A | 1/1921 | Lindberg |
| 7,648,103 | B2 | 1/2010 | Barbosa et al. |

(Continued)

FOREIGN PATENT DOCUMENTS

| DE | 102008037142 A1 | 2/2010 |
| DE | 102009017644 A1 | 10/2010 |

(Continued)

OTHER PUBLICATIONS

German Search Report for Application No. 102019126287.9 dated May 28, 2020, pp. 1-3 (p. 3 listing the cited references).

(Continued)

*Primary Examiner* — Timothy D Collins
*Assistant Examiner* — Eric Acosta
(74) *Attorney, Agent, or Firm* — Lerner David LLP

(57) ABSTRACT

A fluid tank for integration into a structure of an unmanned aircraft includes a shell having a first axial wall, an oppositely arranged second axial wall, an upper side, a lower side, and an enclosed interior, at least one receiving chamber in the interior for storing fluid, and a collection chamber, which is arranged on the lower side and which is fluidically connected to the at least one receiving chamber. The collection chamber includes a bottom surface, through which there extends a drain, wherein a covering surface is arranged above the bottom surface and covers at least a portion of the (Continued)

collection chamber. At least one flow opening could be arranged on an upper side of the collection chamber, which flow opening allows gas bubbles to escape in the direction of the upper side of the fluid tank.

12 Claims, 3 Drawing Sheets

(51) Int. Cl.
  *B64U 50/32* (2023.01)
  *H01M 8/0656* (2016.01)
  *H01M 8/18* (2006.01)
(52) U.S. Cl.
  CPC .......... *H01M 8/0656* (2013.01); *H01M 8/18* (2013.01); *H01M 2250/20* (2013.01)

(56) References Cited

U.S. PATENT DOCUMENTS

| 2010/0032525 | A1 | 2/2010 | Piesker |
| 2012/0098212 | A1 | 4/2012 | Bogiatzis |
| 2013/0105628 | A1* | 5/2013 | Buscher ................. B64U 20/87 244/119 |
| 2015/0210162 | A1* | 7/2015 | Albert ................. B60K 15/077 220/563 |

FOREIGN PATENT DOCUMENTS

| EP | 3492384 A1 | 6/2019 |
| EP | 3524526 A1 | 8/2019 |
| FR | 2756255 A1 | 5/1998 |
| FR | 3071817 A1 | 4/2019 |
| FR | 3071817 B1 * | 9/2019 ........... B64C 39/024 |
| GB | 580006 A * | 8/1946 |
| GB | 580006 A | 8/1946 |

OTHER PUBLICATIONS

International Search Report for Application No. PCT/DE2020/200082 mailed Feb. 2, 2021, pp. 1-4.

* cited by examiner

FLUID TANK FOR INTEGRATION INTO A STRUCTURE OF AN UNMANNED AIRCRAFT

CROSS-REFERENCE TO RELATED APPLICATIONS

The present application is a national phase entry under 35 U.S.C. § 371 of International Application No. PCT/DE2020/200082 filed Sep. 30, 2020, published in German, which claims priority from German Application No. 102019126 287.9 filed Sep. 30, 2019, the disclosures of which are incorporated herein by reference.

TECHNICAL FIELD

The invention relates to a fluid tank for integration into a structure of an unmanned aircraft and to an unmanned aircraft comprising a fluid tank of this kind.

BACKGROUND OF THE INVENTION

Unmanned aircraft can be used for a very wide range of tasks and for this purpose can be of suitable designs and sizes. For example, it is known to perform monitoring tasks from high flying altitudes using aircraft that have a large wingspan, at the same time a high aspect ratio and a very narrow fuselage. It is particularly advantageous if, together with the altitude, long flying times are also achieved. These can be extended, inter alia, by the use of solar cells as energy source. It is known, if sufficient solar radiation is available, to convert solar energy into another energy form and to store this onboard the aircraft. In darkness, the stored energy can be used in turn to drive the aircraft.

One conceivable approach for this forms what is known as the regenerative fuel cell system. In this case, water is broken down into hydrogen and oxygen by solar-operated electrolysis and is stored in suitable tanks onboard the aircraft. As the hydrogen is consumed, water is generated, which is stored onboard. For example, a fuel tank arranged in the vicinity of the center of gravity of the aircraft is used for this purpose.

In order to perform electrolysis continuously, it is necessary to supply a continuous flow of water to an electrolyzer. However, a continuous discharge of water is necessary, also during unexpected flight conditions, which for example include vertical gust loads.

SUMMARY OF THE INVENTION

An object of the invention is to propose a particularly advantageous fluid tank for integration into a structure of an unmanned aircraft, which fluid tank has a desired holding capacity in particular for water and at the same time allows a continuous release of water, even in the event of sudden movements of the aircraft during flight.

The object is achieved by a fluid tank having the features of independent claim 1. Advantageous embodiments and refinements are described in the dependent claims and the following description.

A fluid tank for integration into a structure of an unmanned aircraft is proposed, comprising a shell having a first axial wall, a second axial wall arranged opposite thereto, an upper side, a lower side, and an enclosed interior, at least one receiving chamber in the interior for storing fluid, and a collection chamber which is arranged on the lower side and which is fluidically connected to the at least one receiving chamber. The collection chamber has a bottom surface, through which a drain extends, wherein a covering surface is arranged above the bottom surface and covers at least one portion of the collection chamber.

The outer shape of the fluid tank is defined by the shell. It is conceivable that the fluid tank has an elongated form. This means that it has, in one spatial direction, an extent which significantly exceeds its extent in the two other spatial directions. However, this may be dependent on the desired form of the structure of the unmanned aircraft into which the fluid tank is to be integrated. The shell has two axial walls arranged opposite one another in the form of the first axial wall and the second axial wall. These can also be referred to as tank end bottoms or tank end caps and in each case represent an axial delimitation of the fluid tank. The interior enclosed by the shell is consequently located between the two axial walls.

The at least one receiving chamber is used to store the fluid. It is consequently dimensioned in such a way that the desired or necessary fluid quantity can be received therein. In the above-mentioned case of the use of the fluid tank in conjunction with a regenerative fuel cell system, the at least one receiving chamber could be designed, for example, in such a way that its volume corresponds at least to the water volume that is created during a predetermined operating period of the fuel cell. This operating period could lie, for example, in a range of from 12 to 48 hours.

The collection chamber is arranged on the lower side of the fluid tank, such that fluid can be removed by means of the drain located in the collection chamber, regardless of the fill level in the fluid tank. To this end, the drain extends through the bottom surface and into the collection chamber. It is conceivable that the drain extends straight through the bottom surface and then ends at an inwardly facing delimitation of the bottom surface. However, the drain could also extend over a certain distance into the collection chamber, so that an inlet cross section of the drain is located at a distance from the bottom surface and is directed into the interior.

The covering surface above the bottom surface serves to form an at least partially closed collection chamber. In the event of gusts, which lead to an acceleration of the aircraft directed downwardly along the z-axis of the aircraft, a vertically upwardly directed movement of the fluid in the collection chamber due to inertia forces is largely prevented by the covering surface. Regardless of the fill quantity in the rest of the volume of the interior, an approximately constant quantity of the fluid consequently always remains in the collection chamber and can be removed reliably through the drain. Furthermore, in order to be able to always ensure the removal of fluid from the collection chamber, a continuous replenishment flow of fluid from the at least one receiving chamber into the collection chamber is necessary. This is achieved by the fluidic connection between the collection chamber and at least one receiving chamber. The fluidic connection should be dimensioned such that a continuous replenishment flow is possible. Flow cross sections, however, should remain as small as possible. It is furthermore preferred to provide the fluidic connection in the vicinity of the bottom surface or the lower side of the fluid tank, so that, in the event of load changes on account of vertically directed gusts, fluid is prevented from escaping from the collection chamber.

To summarize, the discussed measures give rise to a fluid tank which can be integrated very well into the structure of an unmanned aircraft and has various advantages. Different load directions which act on the fluid tank and the fluid located therein do not lead to a substantial emptying of the collection chamber, and therefore the fluid can be removed at all times.

At this juncture, it is also noted that the fluid tank could be designed as a pressure tank. The first axial wall and the second axial wall could have, for example, a convex, outwardly directed curvature. A hollow-cylindrical portion could be located between the two axial walls. The fluid can be introduced into the fluid tank at various points and from different directions. In the embodiment as a pressure tank, a pressure-based removal of the fluid must be considered in particular. For example, pressurized air could be applied to the fluid tank, leading to a certain pressure difference between the environment surrounding the fluid tank and the interior. By means of the drain, a pressure sink could be provided, from which the fluid flows out. The removal is thus simplified significantly, and there is no need for a pump for the fluid. This could then be expedient in particular if a pressurized air source is already present in the aircraft, for example in conjunction with an engine.

The fluid tank could be pressurized, however, only in short time intervals. In other, predominant time periods, the fluid tank could also be operated in an unpressurized state.

It is also noted that in the sense of the invention the term fluid is directed in particular towards a substance which, in a state stored inside the fluid tank, in particular has a liquid state of matter. The fluid is particularly preferably water or a water-containing mixture. However, it is not ruled out that other substances are also stored in this fluid tank.

In a preferred embodiment at least one flow opening is arranged on an upper side of the collection chamber and allows gas bubbles to escape in the direction of the upper side of the fluid tank. An accumulation of gas bubbles in the collection chamber should be prevented wherever possible, since otherwise, in the event of an unfavorable movement of the aircraft, the fluid located in the collection chamber could move into the space occupied by the gas bubbles. This can be prevented by allowing any gas bubbles to be discharged through flow openings from the collection chamber. However, the flow openings also allow the fluid itself to flow through. It is therefore preferred that the flow openings are dimensioned in such a way that, in the event of an acceleration of the aircraft directed downwardly along the z-axis, the fluid flows from the collection chamber into the adjoining regions of the interior only with a very limited volume flow rate. The size of the flow opening must consequently also be adapted to the viscosity of the fluid.

The collection chamber preferably has at least one collection chamber wall, which extends from the lower side of the fluid tank to the covering surface and defines the collection chamber, and wherein the at least one collection chamber wall is distanced at least in some regions from an outer collection chamber wall. A further improved arrangement for holding available a small volume of fluid that can be very easily removed could thus be provided. The collection chamber wall, for example, could be located at a relatively short distance from the outer collection chamber wall, so that the inflow or replenishment flow of fluid or air is made possible, whilst the residual volume located in the collection chamber is retained by the covering surface and the collection chamber wall. The flow opening could then be arranged, for example, at an edge of the covering surface, at a transition between the collection chamber wall and the covering surface, at an upper side of the covering surface, or at an upper edge of the collection chamber wall.

In an advantageous embodiment the collection chamber wall encloses a collection chamber gap with the outer collection chamber wall. The gap is to be understood as a space that preferably has a constant or largely constant extent in one direction. The collection chamber gap could extend outwardly starting from a center of the collection chamber, depending on its form, at least in one spatial direction. In some embodiments the collection chamber gap could also be provided in the form of two separate gaps, which are arranged in front of or behind or next to the collection chamber in the axial or lateral direction. A combination of lateral and axial gaps is also conceivable. The collection chamber gap serves to establish the fluidic connection between the collection chamber and the at least one receiving chamber.

It is advantageous if the collection chamber is fluidically connected to the at least one receiving chamber by an opening arranged on the lower side. For the replenishment flow of fluid into the collection chamber, an open flow cross section is necessary, at least at one point, and is preferably located in the region of the bottom surface. In the event of a negative acceleration in the z-direction of the aircraft, the fluid can thus be prevented from leaving the collection chamber by means of flow cross sections of this kind. For example, the opening could be provided in the form of a gap beneath a collection chamber wall. It could also be expedient to provide a collection chamber wall with openings that are arranged on the lower side and extend radially or transversely through the collection chamber wall.

The covering surface preferably has a radially central region, which has a greater distance from the bottom surface than radially outer regions. Gas bubbles could then be guided in a targeted manner to radially inner regions, in order to escape there. It is expedient to provide corresponding flow openings there. The radially central region could, for example, have a convexly shaped bulge. Gas bubbles can accumulate in a targeted manner as a result of a sufficiently large distance. The arrangement of the at least one flow opening in the covering surface allows the gas bubbles to exit into the fluid tank.

The covering surface could further preferably have a conical or ramp-like form. The form can be embodied with a steep or gentle slope in order to allow an improved guidance of the gas bubbles to the provided flow openings. However, it could be expedient to choose a relatively flat form in order to reduce the pressure of the fluid resulting from any negative accelerations to the at least one flow opening.

It is expedient to arrange the collection chamber centrally in a longitudinally axial direction between the first axial wall and the second axial wall. The entire fluid tank could consequently be optimized to be arranged in a center of gravity region or symmetrically to an axis of the aircraft comprising the center of gravity. The fluid is always removed close to the center of gravity. The longitudinally axial direction is based here on a main axis of extent of the fluid tank.

A first receiving chamber preferably adjoins the first axial wall axially, wherein a second receiving chamber adjoins the second axial wall axially. The mass of the fluid in the interior can be somewhat better distributed by two receiving chambers. It can be expedient, depending on the type aircraft and the required size of the interior, to use one or more further receiving chambers.

The collection chamber is particularly preferably arranged symmetrically between the axial walls. If the fluid tank has two outer receiving chambers and one central receiving chamber, the collection chamber can be located in the axial direction between the two outer receiving chambers and beneath the central receiving chamber.

The at least one receiving chamber can have a bottom, which drops away in a ramp-like fashion towards the collection chamber in the direction of the lower side. Due to the ramp-like design of the bottom, the fluid located in the at least one receiving chamber can be guided in a targeted manner to the collection chamber as a result of the force of gravity. The ramp-like design can be formed symmetrically to the collection chamber and can extend over the bottom of the fluid tank laterally of the collection chamber.

The fluid tank according to the invention also has at least one baffle running transversely to the axial direction of the fluid tank. The baffle can in particular mitigate any sloshing of the fluid. It is conceivable that a baffle has a plurality of cutouts, which allow the fluid to pass through. However, it is also conceivable to fully close the baffles except for a side directed towards the collection chamber and to thus allow the interior to be divided into two or more chambers.

The at least one baffle can follow on in particular vertically above or laterally of the collection chamber and in so doing can function simultaneously as a stiffening of the shell.

The fluid tank is preferably formed as a water tank. This means that the faces of the fluid tank turned towards the interior are watertight and preferably resistant to corrosion. The material choice for the fluid tank is suited for the storage of water or of fluids having similar properties, for example mixtures that contain water. The flow opening for allowing the gas bubbles to escape should be dimensioned so as to be as small as possible in order to keep the escape of water from the collection chamber into the rest of the interior as low as possible, without however preventing the escape of gas bubbles. It can be expedient to design the at least one flow opening with an opening width of at least a few millimeters. All further openings, flow cross sections and the like must be suited to the viscosity of the water so as not to prevent or excessively limit a continuous replenishment flow of water between individual regions of the interior.

The invention also relates to an unmanned aircraft comprising at least one wing and at least one fluid tank as described above and integrated into the aircraft. In the case of an unmanned aircraft which is intended in particular for high altitudes, at least one elongate fuselage could be provided, for example. However, flying wing aircraft or aircraft with multiple fuselages are also conceivable. In particular in the case of the embodiment explained above of a solar-supported aircraft, a narrow design with an elongate fuselage could be expedient in order to remain at higher flying altitudes for longer.

Here, the fluid tank is in particular designed to be load-bearing. In order to minimize the weight of the aircraft, the fluid tank according to the invention could consequently be designed to be load-bearing. The arrangement of the individual chambers formed in the interior and the walls located in between can be optimized in order to take on load-bearing functions. For example, a baffle could be used which allows the fluid tank to be stiffened in one direction. By using multiple baffles, which are arranged parallel and/or transversely to one another, a kind of three-dimensional framework structure could be achieved, which lends the fluid tank a particularly high rigidity or strength. The region of the aircraft receiving the fluid tank could thus be formed by the fluid tank or could be limited to a non-load-bearing paneling or the like.

Lastly, the aircraft could comprise at least one regenerative fuel cell, which is fluidically connected to the fluid tank. The water created during operation of the regenerative fuel cell could then be supplied to the interior of the fluid tank. The aircraft preferably furthermore comprises an electrolyzer, which can be brought into fluidic connection to the drain in order to remove water from the fluid tank and in order to break down the water into hydrogen and oxygen by way of an electrolysis process. At least the hydrogen could then be stored accordingly, in order to thus be able to operate the fuel cell.

BRIEF DESCRIPTION OF THE FIGURES

Further features, advantages and possible applications of the present invention will become clear from the following description of the exemplary embodiments and figures. All features described and/or shown in the figures form the subject matter of the invention separately and in any combination, regardless of their composition in the individual claims or their references to other claims. Furthermore, identical or similar objects are identified by the same reference signs in the figures.

DETAILED DESCRIPTION OF EXEMPLARY EMBODIMENTS

Figure 1A:
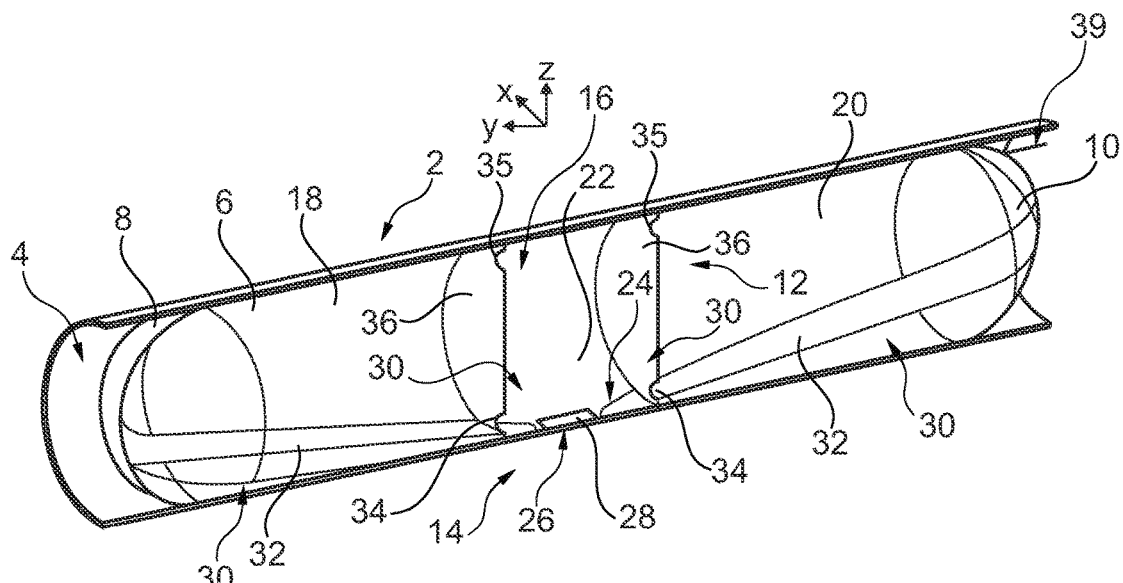
FIGS. 1a and 1b show a fluid tank according to the invention in a number of different views.

FIG. 1a shows a fluid tank 2, which is integrated into a structure 4 of an unmanned aircraft. By way of example, the structure 4 is indicated by a paneling or a fuselage skin or spar skin. The invention is not limited to this. Rather, it may be expedient to integrate the fluid tank in particular into a narrow structure of an aircraft.

The fluid tank 2 comprises a shell 6 with a first axial wall 8, an oppositely arranged second axial wall 10, an upper side 12, a lower side 14, and enclosed interior 16. The interior 16 comprises a first lateral receiving chamber 18, which adjoins the first axial wall 8 axially. A second lateral receiving chamber 20 adjoins the second axial wall 10. Both receiving chambers 18 and 20 are intended to store fluid in the interior 16. They consequently form individual tank segments. Whereas the structure 4 could be produced from a carbon fiber-reinforced plastics material, the shell 6 could consist of an aluminum alloy.

A central receiving chamber 22 is located centrally and is fluidically connected to both lateral receiving chambers 18 and 20. The central receiving chamber 22 has a bottom surface 24 with a collection chamber 28, into which there extends a drain 26.

Both lateral receiving chambers 18 and 20 each have a bottom 32, which drops away slightly in the vertical (z-direction) from the corresponding axial wall 8 or 10 in the direction of the collection chamber 28. The receiving chambers 18, 20 and 22, however, can also have a conical shaping, without a bottom. A fluid, in particular water, can thus flow continuously to the collection chamber 28 from the relevant lateral receiving chamber 18 or 20 as a result of the force of gravity. In order to create a fluidic connection, lower inflow openings 34 are arranged in baffles 36. There, they directly adjoin the corresponding bottom 32. The baffles 36 can extend substantially vertically outwardly from the corresponding bottom 32 towards the upper side 12 of the fluid tank 2. Besides the function of preventing excessive fluid movement, the baffles 36 can additionally contribute to a stiffening and in particular to an increase of the flexural and torsional rigidity of the fluid tank 2. At their upper side, they can comprise upper inflow openings 35, which for example serve to allow the passage of air or other gaseous fluids. A thermal insulation 30 is provided beneath the receiving chambers 18, 20 and 22 and is embodied, for example, as a foam material, in particular as a closed-pore foam material or as aerogel.

Figure 1B:
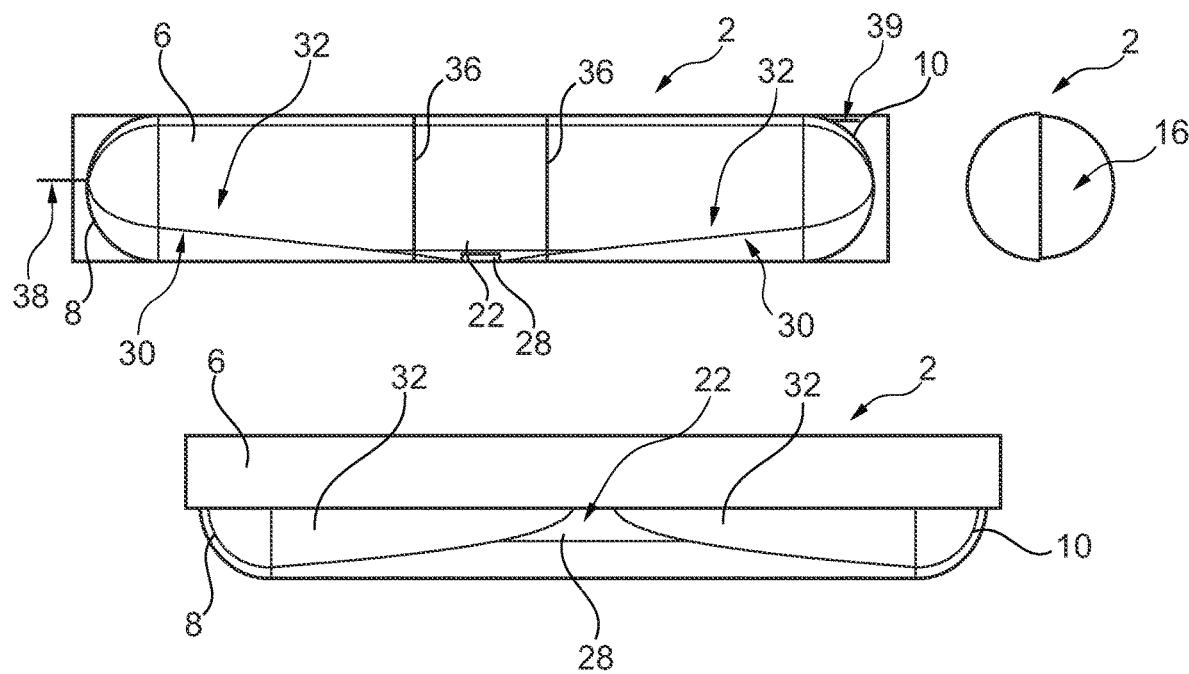

A view of the fluid tank 2 from three sides is shown in FIG. 1b. Here, the elongate, tubular design of the fluid tank 2 is particularly clear. The axial walls 8 and 10 are strongly curved outwardly in a convex manner and can form the fluid tank 2 also as a pressure tank. Fluid can be introduced into the fluid tank 2 at fairly arbitrary points. By way of example, a first fluid inlet 38 and a second fluid inlet 39 are shown. The first fluid inlet 38 could serve for introducing water. It is conceivable that a pressurized gas, for example oxygen, hydrogen or air, is introduced at least temporarily through the second fluid inlet 39, so that fluid can be discharged selectively from the drain 26 by way of a positive pressure prevailing in the fluid tank 2. For example, a valve (not shown) could be attached to the drain and is open in order to remove fluid and is closed after the removal. Fluid, in particular water, could then be supplied for example to an electrolyzer. It may be expedient not to apply a pressure to the fluid tank 2 for the majority of the time.

Figure 2A:
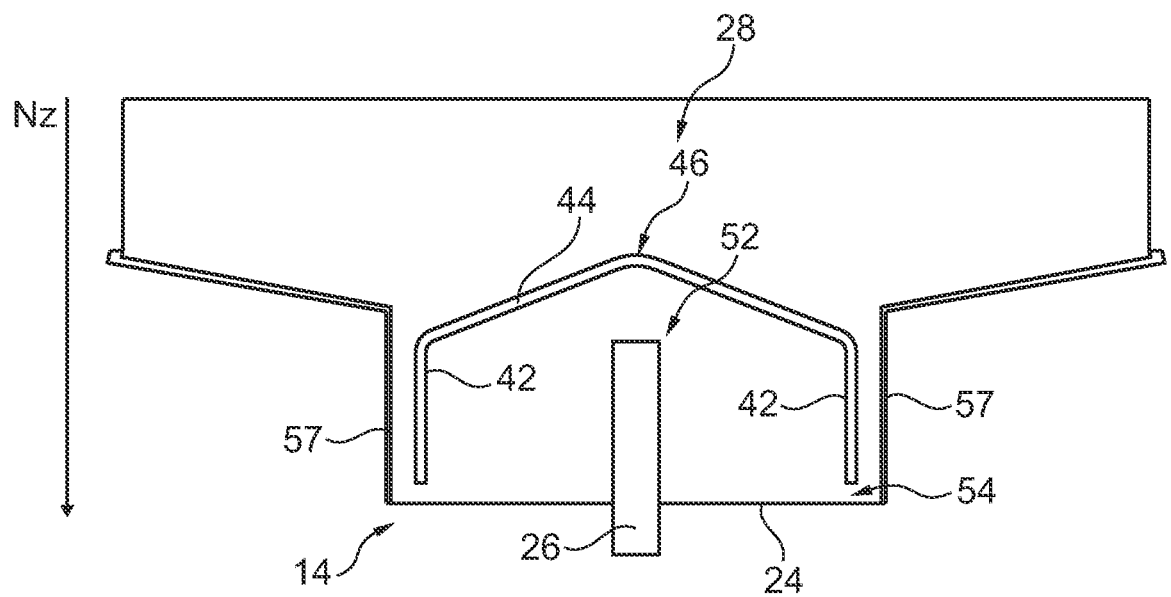
FIGS. 2a and 2b show a detail of a collection chamber in the fluid tank.
Figure 2B:
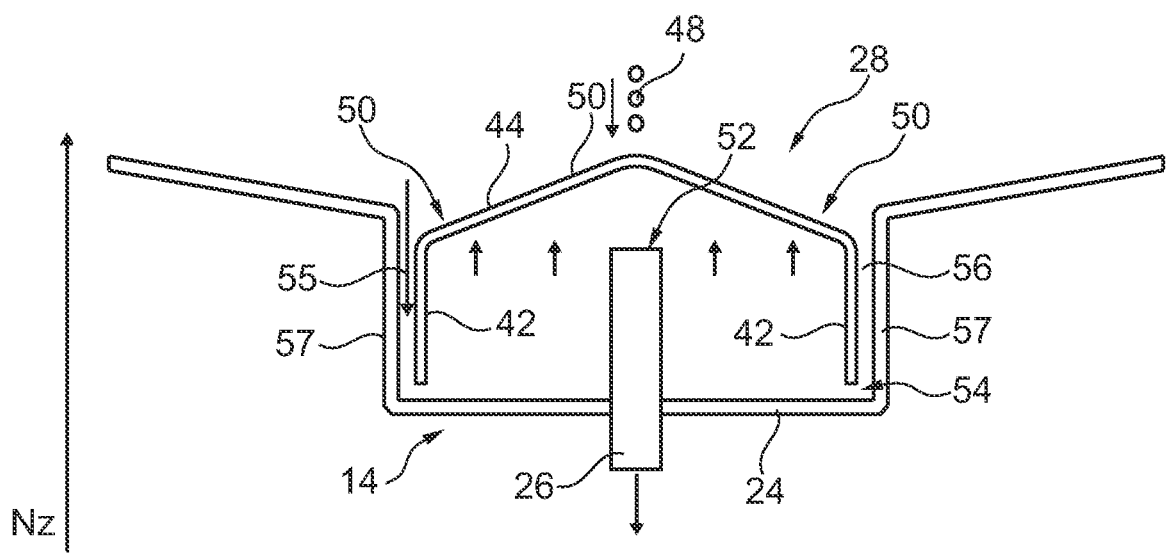
Figure 3:
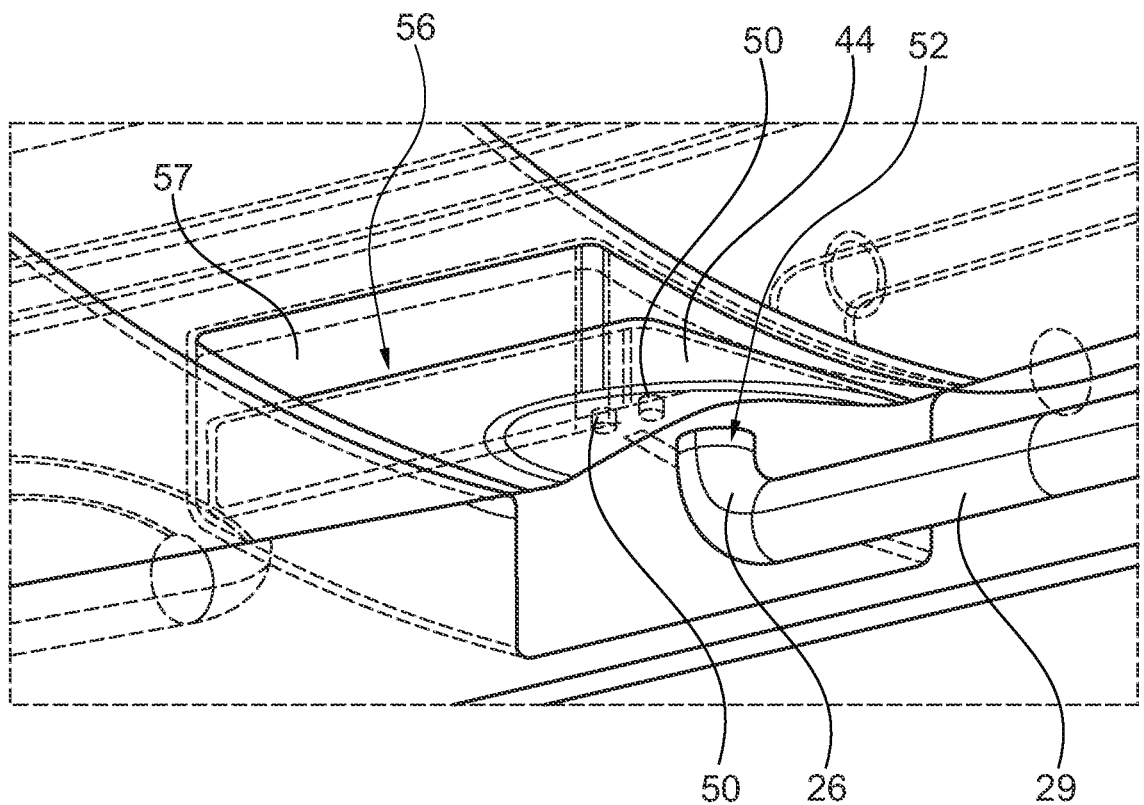
FIG. 3 shows a detail of the collection chamber in a sectional illustration.

In FIGS. 2a, 2b and 3, the collection chamber 28 is shown in sectional illustrations. The collection chamber 28 has two lateral collection chamber walls 42, which extend from the lower side of the fluid tank 2 to a covering surface 44 and in so doing define the collection chamber 28. The covering surface 44 is equipped here with a rounded, flat conical or ramp-like and for example upwardly convexly curved form, so that it has a greater distance, in a radially central region 46, from the bottom surface 24 than in radially outer regions.

Flow openings 50 are arranged in the radially central region 46 and allow gas bubbles to be removed. This is assisted by the shape of the covering surface 44, since, in a steady flight state of the aircraft, gas bubbles can rise in the direction of the covering surface 44 and can then move along the slope into the central region 46 towards the flow openings 50. The drain 26 has an inlet cross section 52 which is distanced significantly from the bottom surface 24 and ends below the radially central region 46. Fluid can be removed from the collection chamber 28 through the drain 26. Under steady flight conditions, it is assumed that the collection chamber 28 is always filled with the fluid that is to be removed.

With reference to FIG. 2b, it is shown how, in the event of a vertically downwardly directed acceleration of the aircraft, indicated by the vertically upwardly directed load factor NZ, fluid in the collection chamber 28 is urged in the direction of the covering surface 44 as a result of inertial forces. The fluid can leave the collection chamber 28 through the covering surface 44 only via the flow openings 50. If the flow openings 50 are dimensioned so as to be sufficiently small, the fluid can only escape in the form of droplets 48. In order to balance the pressure in the collection chamber 28, air 55 can enter through a collection chamber gap 56 surrounding the collection chamber 28. At the same time, however, the passage of gas bubbles is not prevented under steady operating conditions. Both in the steady state in FIG. 2a and in the gust load situation in FIG. 2b, the inlet cross section 52 is fully fluidically connected, so that reliable fluid removal is possible in both cases.

It is furthermore shown here that flow openings 34 from FIG. 1a are fluidically connected by a gap 54 above the bottom surface 24 and below the collection chamber walls 42 in conjunction with the collection chamber gap 56 between the collection chamber walls 42 and outer collection chamber walls 57. In the case of a conical embodiment of the receiving chambers 18 and 20, the collection chamber walls 57 could also be embodied as an outer wall of the fluid tank 2. Under steady conditions, fluid can continue to flow into the collection chamber 28 through a flow path formed hereby. In the load situation shown in FIG. 2b, air or another gas continues to flow through this flow path into the collection chamber 28. Due to the dimensioned openings 50 having the smallest possible dimensions and the inlet cross section 52 distanced far from the bottom surface 24, a significant amount of time would pass theoretically until the fluid would be displaced and the air would actually reach the inlet cross section 52. With a sufficiently dimensioned size of the collection chamber 28, it can consequently be ensured that a vertical acceleration of this kind does not last, in any likely load situation, for such a period of time that this state could occur. The maximum volume of the collection chamber 28 is defined by the upper edge of the gap 54.

As can be seen in FIG. 3, the drain 26 can be connected to a removal line 29, which extends beneath the fluid tank 2. Depending on the embodiment, the removal line 29 can extend beyond the axial wall 8 or 10 or can be bent over its course in another direction.

Figure 4:
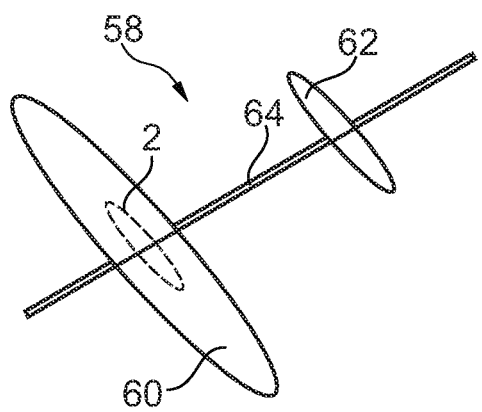
FIG. 4 shows a schematic view of an unmanned aircraft.

Lastly, FIG. 4 shows, very schematically, an unmanned aircraft 58, into which a fluid tank 2 is integrated. This illustration is to be understood merely to be exemplary and is not intended to limit the subject matter to an aircraft of this kind. By way of example, the fluid tank 2 is arranged transversely on, in or beneath wings 60. The fluid tank 2 could alternatively be arranged in a tail unit 62. In a further alternative, the fluid tank 2 could also be arranged in a fuselage 64. Further embodiments of aircraft without a fuselage, with multiple fuselages and with or without a separate tail unit are conceivable.

In addition, it should be noted that the term "comprising" does not rule out any other elements or steps, and "a" or "an" does not rule out a plurality. It should also be noted that features that have been described with reference to one of the above exemplary embodiments can also be used in combination with other features of other above-described exemplary embodiments. Reference signs in the claims shall not be considered to represent a limitation.

LIST OF REFERENCE SIGNS 2 fluid tank
4 structure
6 shell
8 first axial wall
10 second axial wall
12 upper side
14 lower side
16 interior
18 first receiving chamber
20 second receiving chamber
22 central receiving chamber
24 bottom surface
26 drain
28 collection chamber
30 thermal insulation
32 bottom
34 lower inflow opening 35 upper inflow opening
36 baffle
38 first fluid inlet
40 second fluid inlet
42 collection chamber wall
44 covering surface
46 radially central region
48 droplet
50 flow opening
52 inlet cross section
54 gap/radial opening
55 air
56 collection chamber gap
57 outer collection chamber wall
58 aircraft
60 wing
62 tail unit
64 fuselage

The invention claimed is:

1. A fluid tank for integration into a structure of an unmanned aircraft, comprising:
   a shell having a first axial wall, an oppositely arranged second axial wall, an upper side, a lower side, and an enclosed interior,
   at least one receiving chamber in the enclosed interior for storing fluid,
   a collection chamber arranged on the lower side and fluidically connected to the at least one receiving chamber; and
   at least one baffle running transversely to an axial direction of the fluid tank, wherein the at least one baffle comprises at least one upper inflow opening,
   wherein the collection chamber has a bottom surface, through which there extends a drain,
   wherein a covering surface is arranged above the bottom surface and covers at least a portion of the collection chamber,
   wherein the collection chamber is arranged centrally in a longitudinally axial direction between the first axial wall and the second axial wall,
   wherein the at least one receiving chamber comprises a first receiving chamber adjoining the first axial wall axially, and a second receiving chamber adjoining the second axial wall axially.

2. The fluid tank as claimed in claim 1,
   wherein at least one flow opening is arranged on an upper side of the collection chamber and allows gas bubbles to escape in the direction of the upper side of the fluid tank.

3. The fluid tank as claimed in claim 1,
   wherein the collection chamber comprises at least one collection chamber wall, which extends from the lower side of the fluid tank to the covering surface and defines the collection chamber, and
   wherein the at least one collection chamber wall is distanced at least in some regions from an outer collection chamber wall.

4. The fluid tank as claimed in claim 3,
   wherein the collection chamber wall encloses a collection chamber gap with the outer collection chamber wall.

5. The fluid tank as claimed in claim 3,
   wherein the collection chamber is fluidically connected to the at least one receiving chamber by an opening arranged on the lower side.

6. The fluid tank as claimed in claim 1,
   wherein the covering surface comprises a radially central region having a greater distance from the bottom surface than radially outer regions.

7. The fluid tank as claimed in claim 1,
   wherein the at least one receiving chamber comprises a bottom dropping away in a ramp-like manner in a direction of the lower side towards the collection chamber.

8. The fluid tank as claimed in claim 1,
   wherein the at least one baffle is arranged vertically above or laterally of the collection chamber.

9. The fluid tank as claimed in claim 1,
   wherein the fluid tank is a water tank.

10. An unmanned aircraft, comprising at least one wing and at least one fluid tank according to claim 1 integrated into the unmanned aircraft.

11. The unmanned aircraft as claimed in claim 10,
    wherein the fluid tank is configured to be load-bearing.

12. The unmanned aircraft as claimed in claim 10,
    further comprising at least one regenerative fuel cell, which is fluidically connected to the fluid tank, and
    an electrolyzer configured to be brought into fluidic connection to the drain to remove water from the fluid tank and to break down the water into hydrogen and oxygen by way of an electrolysis process.

* * * * *